April 28, 1936. D. E. LINDQUIST 2,038,868
JOINT
Filed Sept. 25, 1935 2 Sheets-Sheet 1

David E. Lindquist,
Inventor,
Delor F. Haynes,
Attorney

April 28, 1936.　　　D. E. LINDQUIST　　　2,038,868
JOINT
Filed Sept. 25, 1935　　　2 Sheets-Sheet 2

David E. Lindquist,
Inventor,
Deloe F. Haynes,
Attorney.

Patented Apr. 28, 1936

2,038,868

UNITED STATES PATENT OFFICE 2,038,868

JOINT

David E. Lindquist, Port Huron, Mich., assignor to Mueller Brass Co., Port Huron, Mich., a corporation of Michigan Application September 25, 1935, Serial No. 41,969

3 Claims. (Cl. 285—117)

This invention relates to joints, and with regard to certain more specific features, to joints and the fittings therefor, by which lengths of pipe and the like are connected together.

Among the several objects of the invention may be noted the provision of a pipe or like fitting which is adapted to produce an improved locked joint between the pipe and fitting; the provision of a fitting of the class described which, in addition to providing a locked joint, is adapted for the effectuation of a securely sealed joint; the provision of a fitting of the class described which may be assembled into a joint with minimum effort and maximum speed and facility; and the provision of a fitting of the class described which is relatively simple and economic to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of a joint embodying the present invention;

Similar reference characters indicate corresponding parts throughout the several views of the drawings.

Figure 1:
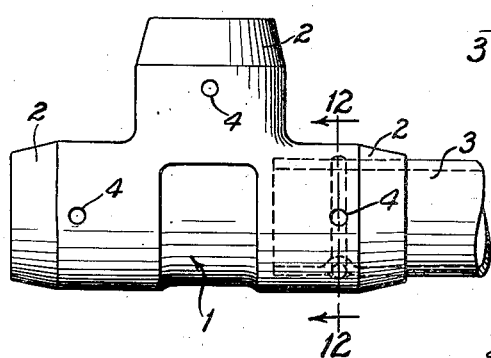

Referring now more particularly to Fig. 1, numeral 1 indicates a relatively heavy, non-deformable metallic pipe fitting, which, for purpose of illustration, has been shown as a T. The T has been chosen for exemplary purposes only, and it is to be understood that the invention applies with equal facility to all classes of pipe fittings, as L's, couplings, crosses, nipples, adapters, caps valve ends, and the like, the sole criterion being that the fitting must have a socket portion 2 which is adapted to telescopically receive the length of pipe or the like which it is desired to connect thereto. The T-fitting illustrated, in accordance with its shape, has three such socket portions 2.

Basically, the fitting 1 is of the general type shown in Gresley et al., Patent Number 1,776,502, dated September 23, 1930. That is, it is a fitting designed particularly for use with unthreaded, relatively deformable thin-walled pipe, which is usually made of copper. Such a pipe, for example, is indicated at numeral 3. In accordance with the teaching of the said Gresley et al. patent, the joint effected with this fitting is made by telescoping the pipe 3 into one of the sockets 2, and thereafter introducing liquid solder or like sealing material through a sprue or feed-hole 4 into an internal groove 5 (see Fig. 2), whence it is fed by capillary attraction to the interface region between the pipe and fitting. It will be understood that the receiving portion of the socket 2 and the pipe 3 are so dimensioned that the clearance therebetween is of suitable size to induce such capillary flow of the liquid solder.

The present invention provides new means, in addition to the solder film described, whereby the pipe 3 is securely locked into the fitting 1.

Figure 2:
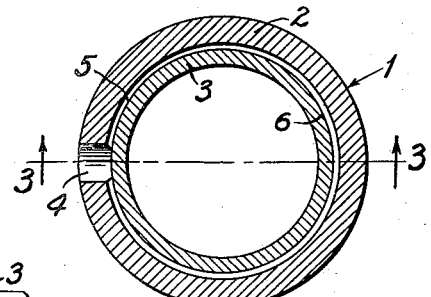
Fig. 2 is a cross section illustrating an initial assembly in making a joint.
Figure 3:
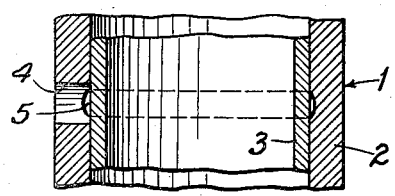
Fig. 3 is an axial section taken along line 3—3 of Fig. 2.

Referring now more particularly to Fig. 2, numeral 6 indicates the inner smooth, cylindrical wall of the socket portion 2. Numeral 5, as has been intimated, indicates an interior annular groove which is formed on the inner wall 6 intermediate its ends. Numeral 4, as has likewise been intimated, indicates a sprue or solder feed hole. The inner smooth walls 6, inner annular groove 5, and sprue or solder feed hole 4, constitute the distinctive features of the fitting used in the present invention. Thus, it will be seen, the fitting is substantially identical to that described in the aforesaid Gresley et al. patent.

Figure 14:
Fig. 14 is an elevation of a locking element.
Figure 13:
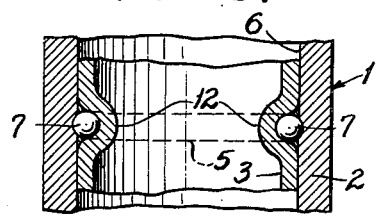
Fig. 13 is an axial section taken substantially along line 13—13 of Fig. 12.

The locking means heretofore referred to for use with the present invention, comprises one or more relatively small members, such as the hardened steel ball indicated in Fig. 14 by numeral 7. The ball 7 in Fig. 14 is considerably enlarged; in practice, it is desirable that the diameter of the ball 7 be slightly less than the width of the groove 5.

The manner in which the ball 7 is used to lock the joint of the present invention is illustrated in succesive steps in Figures 2 through 13. Referring now more particularly to Fig. 2, this figure shows the socket 2 with the pipe 3 telescoped therein. This comprises the first step in making the joint, namely, telescoping the pipe 3 into the socket 2.

Figure 4:
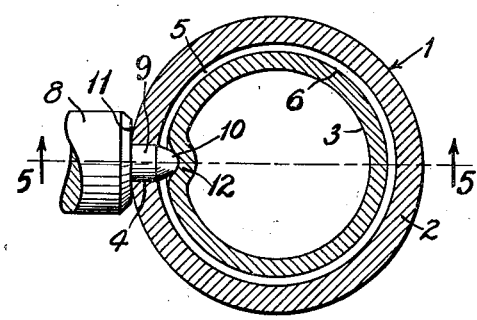
Fig. 4 is a cross section similar to Fig. 2, showing a subsequent step in making the joint.

Numeral 8 in Fig. 4 indicates a punch or tool which has a forward projection 9 substantially equal in diameter to the diameter of the sprue 4, and a rounded nose 10. After the pipe 3 is in position as in Figures 2 and 3, this punch 8 is inserted through the sprue 4 until a shoulder 11 abuts the outer wall of the socket 2. The rounded nose 10 thereby makes a circular indentation or dent 12 in the wall of the pipe 3. The punch 8 is then removed. Because of the thin walls of the pipe 3, the indentation 12 has a corresponding protuberance on the interior of the pipe 3.

Figure 6:
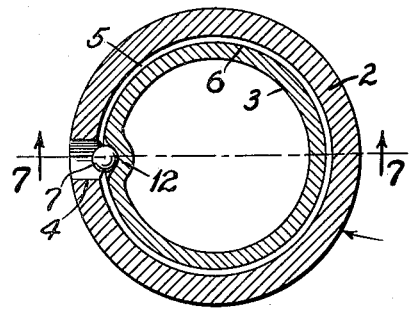
Fig. 6 is a cross section similar to Figures 2 and 4, illustrating a further step in making the joint.
Figure 5:
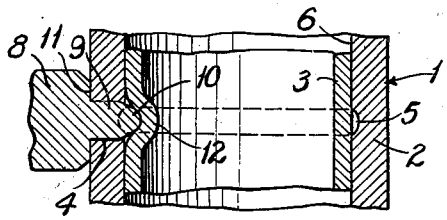
Fig. 5 is an axial section taken substantially on line 5—5 of Fig. 4.
Figure 7:
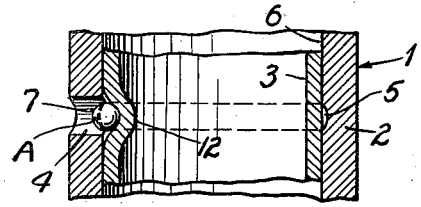
Fig. 7 is an axial section taken substantially on line 7—7 of Fig. 6.

Referring now to Figs. 6 and 7, it will be seen that one of the balls 7 has been dropped through the sprue 4 into the dent 12. The depth of the dent 12 is preferably such that the ball 7, when bottomed in the dent 12, still extends a bit above the bottom of the groove 5. This relationship is indicated at letter A in Fig. 7.

Figure 8:
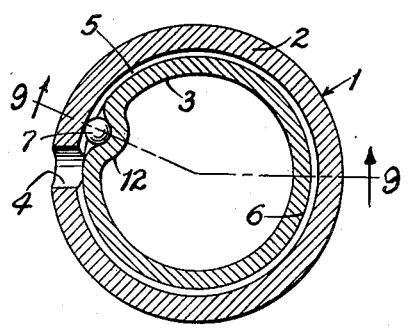
Fig. 8 is a cross section similar to Figures 2, 4, and 6, illustrating a further step in making the joint.

The next step in assembling the joint is illustrated in Fig. 8. In this figure, the pipe 3 has been rotated or twisted within the fitting 2, to such an angle that the ball 7 is no longer opposite the sprue 4. By so twisting the pipe, the ball 7, engaging the bottom of the groove 5, will have forced itself deeper into the dent 12, thereby somewhat deepening said dent 12, but at the same time binding itself firmly in position. The ball 7 is now embedded between the groove 5, which is a declivity in the fitting, and the dent 12, which is a declivity in the pipe 3. It thus serves as a member locking the pipe and fitting together against relative axial movement, that is, against slipping the pipe out of the fitting. In some circumstances, one ball 7 thus applied, is sufficient to make a locked joint, and from the locking standpoint, the joints illustrated in Figs. 8 and 9 may accordingly be considered completed. However, in the majority of circumstances it is more desirable that a plurality of balls 7 be used to lock the joint, for the reason that when one ball 7 is used, as in Figure 8, it has a tendency to drive the pipe 3 off center in the fitting 2, and thereby destroy the even spacing between the pipe and fitting, and render the spreading of sealing material, such as solder, somewhat more difficult.

Figure 10:
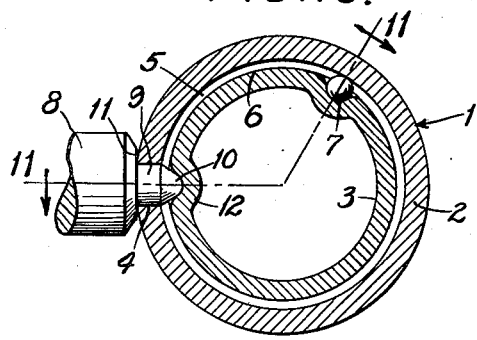
Fig. 10 is a cross section similar to Figures 2, 4, 6, and 8, illustrating a subsequent step.
Figure 9:
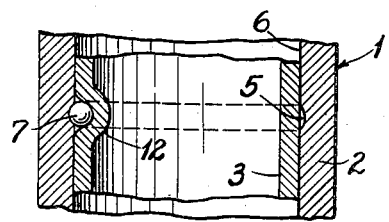
Fig. 9 is an axial section taken substantially on line 9—9 of Fig. 8.
Figure 11:
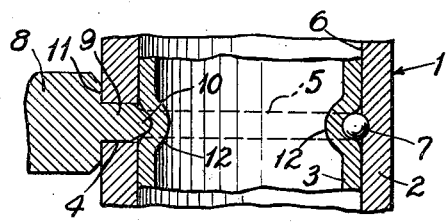
Fig. 11 is an axial section taken substantially along line 11—11 of Fig. 10.

Figs. 10 and 11 show the application of a second ball 7 in substantially the same manner as that above described, the second ball being positioned at an angle of about 120° from the first ball.

Figure 12:
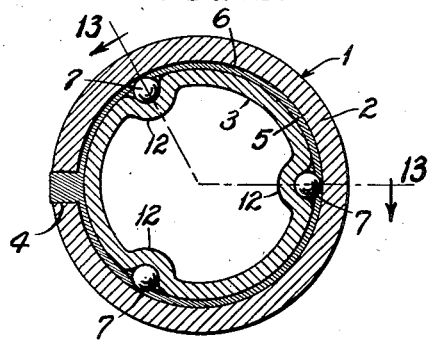
Fig. 12 is a cross section similar to Figures 2, 4, 6, 8, and 10, but illustrating a completed joint, and is taken substantially along line 12—12 of Fig. 1.

In a preferred form of the joint, three balls 7 are used, which are spaced apart at 120° intervals, as indicated in Fig. 12. When thus assembled, the three balls 7 tend to center the pipe in the fitting, thereby preserving the original capillary spacing of the pipe and the fitting. Besides, the three balls 7 provide mechanically a much more secure lock than one or two balls 7.

With all three balls 7 in position as in Fig. 12, liquid solder or similar sealing material may be fed in through the opening or sprue 4 to seal the joint. From the drawings, it will be seen that the balls 7 do not completely fill the groove 5. Hence the liquid solder may be introduced into the fitting and may travel around the fitting through the groove 5 to be spread by capillary attraction into the interfacial region in the same manner as set forth in the said Gresley et al. patent. By the addition of said sealing material, the joint is made tight or is sealed in addition to being locked.

A combination locked and sealed joint, such as that just described, is particularly useful, for example, in fire sprinkler installations where it is essential that the installation remain in position even though the temperature becomes sufficiently high to melt out the solder. With a joint as thus described, even if the solder or sealing material melts and runs out of the joint, a locked joint which is relatively tightly sealed is still maintained, and the pipe does not come out of the fitting. In many other circumstances, such a type of joint is desirable.

Figure 15:
Fig. 15 is an elevation of a locking element alternative to that shown in Fig. 14.

In the majority of circumstances, the smooth-surfaced ball 7 is satisfactory for making the joint herein described. However, it is also possible and sometimes advisable to use a ball 13 such as illustrated in Fig. 15 in which the surface is covered with a series of longitudinal grooves or serrations. These grooves or serrations have sharp edges, such that when they are introduced into the fitting in making the joint, they bite more deeply into the metal of the fitting and/or the pipe, thereby to secure even a more firm locking action. The ball 13 is somewhat similar to the heads of dentists' drills with the shank of the drill, of course, removed.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A joint comprising a fitting having a socket, a thin-walled metallic entering member telescopingly received in said socket, said socket having an opening, and a preformed interior encircling groove leading from said opening, at least one relatively small locking member introduced through said opening and positioned in said groove and engaging the entering member in such manner as to form, at least in part by its introduction, an indentation in said entering member facing oppositely to said groove, with a corresponding protuberance on the interior of the entering member, and a film of solidified sealing material occupying the interfacial region between said socket and said entering member.

2. A joint comprising a relatively nondeformable metallic fitting having a socket, a thin-walled relatively deformable metallic entering member telescopingly received in said socket, said socket having an opening, and a preformed interior encircling groove leading from said opening, at least one locking member in the form of a relatively hard, relatively small ball introduced through said opening and positioned in said groove and engaging the entering member in such manner as to form, at least in part by its introduction, an indentation in said entering member facing oppositely to said groove, with a corresponding protuberance on the interior of the entering member, and a film of solidified sealing material occupying the interfacial region between said socket and said entering member.

3. A joint comprising a relatively non-deformable metallic fitting having a socket, a thin-walled relatively deformable metallic entering member telescopingly received in said socket, said socket having an opening, and a preformed interior encircling groove leading from said opening, at least one locking member in the form of a relatively hard, relatively small serrated surface ball introduced through said opening and positioned in said groove and engaging the entering member in such manner as to form, at least in part by its introduction, an indentation in said entering member facing oppositely to said groove, with a corresponding protuberance on the interior of the entering member, and a film of solidified sealing material occupying the interfacial region between said socket and said entering member.

DAVID E. LINDQUIST.